US007547355B2

(12) United States Patent
Seki et al.

(10) Patent No.: US 7,547,355 B2
(45) Date of Patent: Jun. 16, 2009

(54) SOLID DRAWING MATERIAL

(75) Inventors: Koji Seki, Kuki (JP); Jung Han Sin, Daejeon (KR)

(73) Assignee: Buncho Corporation, Tokyo (JP)

( * ) Notice: Subject to any disclaimer, the term of this patent is extended or adjusted under 35 U.S.C. 154(b) by 459 days.

(21) Appl. No.: 11/530,610

(22) Filed: Sep. 11, 2006

(65) Prior Publication Data

US 2007/0204760 A1 Sep. 6, 2007

(51) Int. Cl.
*C09D 13/00* (2006.01)

(52) U.S. Cl. .............. 106/31.07; 106/31.11; 106/31.94; 106/31.97

(58) Field of Classification Search .............. 106/31.07, 106/31.11, 31.94, 31.97
See application file for complete search history.

*Primary Examiner*—Jerry Lorengo
*Assistant Examiner*—Veronica Faison Gee
(74) *Attorney, Agent, or Firm*—Hahn & Voight PLLC; Roger C. Hahn

(57) ABSTRACT

A solid drawing material containing a gel-forming substance of an alkali metal salt or an ammonium salt of an aliphatic carboxylic acid having 8 to 36 carbon atoms, an alkoxylated nitrogen-containing compound, a reduced starch saccharide, and a coloring agent. The solid drawing material which is in the form of a stick features a large strength, a small drawing resistance, is less subject to be collapsed or broken, produces little shavings while drawing, makes it possible to favorably form a drawing even on smooth surfaces such as window-panes, and of which the traces after drawn can be easily wiped out with a wet cloth.

6 Claims, 1 Drawing Sheet

1

2

3

4

SOLID DRAWING MATERIAL

BACKGROUND OF THE INVENTION

1. Field of the Invention

The present invention relates to a solid drawing material and, particularly, to a solid drawing material which features particularly smooth draw feeling, and is not easily collapsed and is not easily broken, either.

2. Description of the Related Art

A crayon which uses wax like paraffin as a solidifying agent is accompanied by such defects that it cannot provide a flat surface of application, involves difficulty when it is attempted to apply it to wide areas, does not permit the applied surface to be cured which, therefore, is prone to be contaminated and discolored and, further, makes it difficult to apply another crayon thereon since the applied surface becomes slippery. A pastel, on the other hand, contains neither wax nor oil and comes in a sticky form by solidifying a powder of pigment or the like with a water-soluble adhesive component of a low concentration. However, the pastel cannot be fixed onto a paper. Therefore, a color must be fixed by spraying a special fixing solution onto the drawing surface. Besides, the pastel has another defect in that the powder thereof scatters to foul the surrounding.

In order to improve the above defects, solid drawing materials in the form of aqueous gel sticks have been proposed by using an alkali metal salt or an ammonium salt of an aliphatic carboxylic acid as a gelling agent (see patent document 1, patent document 2 and patent document 3).

[Patent document 1] JP-A-1-217090

[Patent document 2] JP-A-4-337372

[Patent document 3] JP-A-5-311107

When compared to the wax-type crayon, however, the solid drawing materials disclosed in the above patent documents 1 to 3 are weak, and are subject to be collapsed and broken during the use. The hardness can be increased to some extent by increasing the ratio of blending a soap such as an alkali metal salt causing, however, a decrease in the flexibility of a stick which, therefore, becomes rather subject to be broken. Besides, smooth draw feeling is impaired and shavings are produced much while drawing. Moreover, fluidity of the sol so decreases that it becomes difficult to execute the molding for production.

SUMMARY OF THE INVENTION

It is therefore an object of the present invention to provide a solid drawing material which, as compared to the conventional counterparts, features a large strength of stick and, particularly, a small drawing resistance (which means smooth draw feeling), is less subject to be collapsed or broken, produces little shavings while drawing, makes it possible to favorably form a drawing even on smooth surfaces such as windowpanes, and of which the traces after drawn can be easily wiped out with a wet cloth.

According to the present invention, there is provided a solid drawing material containing a gel-forming substance of an alkali metal salt or an ammonium salt of an aliphatic carboxylic acid having 8 to 36 carbon atoms, an alkoxylated nitrogen-containing compound, a reduced starch saccharide, and a coloring agent.

In the solid drawing material of the present invention, it is desired that:

(a) the reduced starch saccharide is obtained by decomposing a starch with an enzyme followed by reduction by hydrogenation;

(b) the alkoxylated nitrogen-containing compound (a nitrogen-containing compound that is alkoxylated) is an aliphatic amino-alcohol; and (c) the aliphatic amino-alcohol is at least one selected from the group consisting of ethanolamine, diethanolamine, triethanolamine, dimethylethanolamine, isopropanolamine, triisopropanolamine and isobutanolamine.

According to the present invention, there is further provided a method of producing a solid drawing material comprising steps of:

preparing a starting composition which contains a gel-forming substance of an alkali metal salt or an ammonium salt of an aliphatic carboxylic acid having 8 to 36 carbon atoms, an alkoxylated nitrogen-containing compound, a reduced starch saccharide, a coloring agent and water; and molding the starting composition by heating followed by cooling.

In the production method of the present invention, it is desired that the starting composition contains the gel-forming substance in an amount of 5to 50% by weight, the alkoxylated nitrogen-containing compound in an amount of 2 to 20% by weight and the reduced starch saccharide in an amount of 5 to 30% by weight.

As compared to the conventional counterparts, the solid drawing material of the present invention features a large bending strength of stick, a small drawing resistance, is less subject to be collapsed or broken, produces little shavings while drawing, makes it possible to favorably form a drawing even on smooth surfaces such as windowpanes, and of which the traces after drawn can be easily wiped out with a wet cloth. When a dye that dyes fibers little is used as a coloring agent, there can be obtained a solid drawing material of the washable type enabling hands and clothes tainted with the color to be easily washed away with water. The solid drawing material having the above features of the invention also offers the following advantages.

(i) It is suited for being used as a crayon by little children in kindergartens.

(ii) An alkali metal salt or an ammonium salt of an aliphatic carboxylic acid which is an aqueous gel is contained as a base material. Therefore, when the surface drawn with the drawing material is treated with a brush impregnated with water, the portions drawn with the brush become blurred exhibiting an effect like the one painted with water colors.

(iii) Can be used for decorating the windows of shops and for writing menus on message boards placed in the shops.

DETAILED DESCRIPTION OF THE INVENTION

Figure 1:
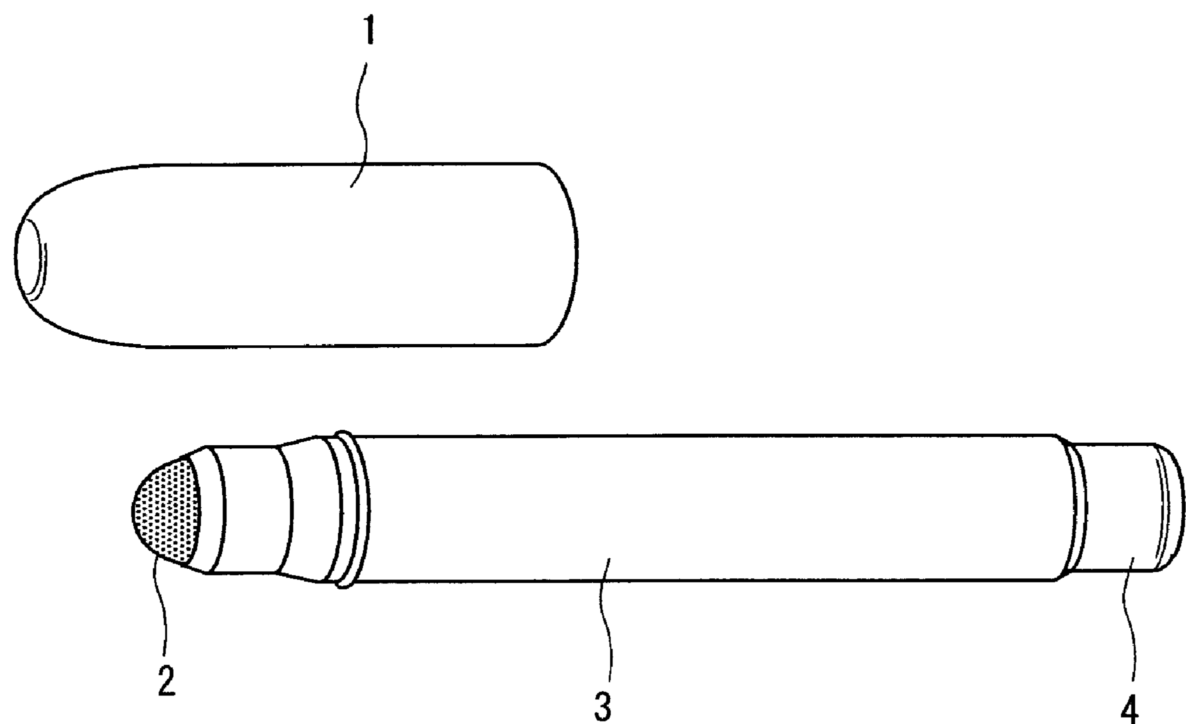
FIG. 1 is a view of appearance of a writing utensil comprising a solid drawing material of the invention contained in a delivery-type holder.

The solid drawing material according to the present invention is produced by heating a starting composition which contains a gel-forming substance of an alkali metal salt or an ammonium salt of an aliphatic carboxylic acid having 8 to 36 carbon atoms, an alkoxylated nitrogen-containing compound, a reduced starch saccharide, a coloring agent and water, followed by cooling.

(1) Gel-Forming Substances;

An alkali metal salt or an ammonium salt of an aliphatic carboxylic acid having 8 to 36 and, particularly, 12 to 18 carbon atoms is used in the present invention as a gel-forming substance. The fatty acid for forming the above salt may be the one with or without branch so far as the carbon number is within the above range, and its concrete examples include caprylic acid, pelargonic acid, undecanoic acid, lauric acid, myristic acid, palmitic acid, stearic acid, arachic acid, behenic acid, lignoceric acid, cerotic acid, montanic acid and mellisic acid. The alkali metal salt may be any one of lithium salt, sodium salt or potassium salt. In the present invention, what is most desirably used as the gel-forming substance is sodium myristate, sodium palmitate or sodium stearate. They may be used in a single kind or in two or more kinds in combination.

It is desired that the aliphatic carboxylate is contained in an amount of 5 to 50% by weight and, particularly, in an amount of 8 to 45% by weight in the starting composition. When the amount of the aliphatic carboxylate is smaller than the above range, gel is not easily formed, and the strength of the obtained solid drawing material stick may decrease. When the amount of use thereof is greater than the above range, on the other hand, the aliphatic carboxylate melts little when being heated, disperses poorly causing such inconveniences as the occurrence of shavings in increased amounts during the drawing and increased drawing resistance. Besides, fluidity decreases during the molding and, therefore, it becomes difficult to accomplish the molding.

(2) Alkoxylated Nitrogen-Containing Compounds;

The alkoxylated nitrogen-containing compound lowers the viscosity at the time of heat-melting, facilitates the filling in a metal mold and in a holder, and imparts smooth draw feeling. As the alkoxylated nitrogen-containing compound, there can be exemplified aliphatic amino-alcohol, alicyclic amino-alcohol, and aromatic amino-alcohol. Among them, aliphatic amino-alcohol is preferred and is, desirably, in a liquid form at normal temperature.

The aliphatic amino-alcohol preferably used in the present invention is expressed by the following general formulas (1) to (3):

$$R^1{}_2NR^2OH \quad (1)$$

$$R^1N(R^3OH)_2 \quad (2)$$

$$N(R^4OH)_3 \quad (3)$$

wherein $R^1$ is a hydrogen atom or an alkyl group having 1 to 6 carbon atoms, and a plurality of $R^1$s may be the same or different, $R^2OH$, $R^3OH$ and $R^4OH$ are, respectively, alkoxyl groups having 1 to 6 carbon atoms or groups represented by the formula $-R^5OR^6OH$, (wherein $R^5$ and $R^6$ are alkylene groups, respectively, and the total number of carbon atoms of $R^5$ and $R^6$ is 2 to 10), and pluralities of $R^3OH$ and $R^4OH$ may be the same or different.

Concrete examples of the aliphatic amino-alcohol include ethanolamine, diethanolamine, triethanolamine, dimethylethanolamine, isopropanolamine, diisopropanolamine, triisopropanolamine, isobutanolamine, N,N-diethylethanolamine, N,N-dibutylethanolamine, N-methyl-N,N-diethanolamine, dimethylisopropanolamine, methylethanolamine, aminoethylethanolamine, ethyldiethanolamine and N,N-diisopropylethanolamine, which may be used in a single kind or in two or more kinds in combination. Among these aliphatic amino-alcohols, particularly desired are ethanolamine, diethanolamine, triethanolamine, dimethylethanolamine, isopropanolamine, triisopropanolamine and isobutanolamine.

The alkoxylated nitrogen-containing compound is used in the starting composition in an amount of 2 to 20% by weight, preferably, 3 to 15% by weight and, most preferably, 3.5 to 10% by weight. When the amount of the alkoxylated nitrogen-containing compound is smaller than the above range, fluidity of the starting composition decreases when it is heat-melted and becomes difficult to be poured into the mold or the holder. Besides, the obtained solid drawing material exhibits increased drawing resistance and brings about such an inconvenience as increased shavings while drawing. When used in an amount greater than the above range, on the other hand, releasing property may decrease.

(3) Reduced Starch Saccharides;

The reduced starch saccharide used in the invention is obtained by hydrogenating (reducing) various starch syrups obtained by decomposing starches with an enzyme, and is also used for foods, sweeteners, crystallization-preventing agents and lustering/viscosity-imparting agents.

Decomposition of starches form saccharids of various polymerization degrees from which it is difficult to isolate particular polysaccharides only. Therefore, a mixture of saccharides is used upon being reduced (hydrogenated). The saccharides (mixture of sugars) for being reduced are, for example, polysaccharides higher than disacchardide or the one comprising chiefly disaccharide to octasaccharide (in amounts of, for example, not less than 85% by weight). The monosaccharide or the disaccharide that is reduced absorbs water to a large extent, and is not capable of forming a dry film to a sufficient degree, which is not desirable. The saccharides exhibit a decreased hygroscopic property with an increase in the molecular weight thereof, and become capable of easily forming a dry film. Besides, the saccharides exhibit improved heat resistance, resistance against acids and resistance against microorganisms, and maintain a stable state in the solid drawing material. A reduced starch saccharide having a solid content of not smaller than 60% by weight can be preferably used. The reduced starch saccharides have been placed in the market by Hayashibara Shoji Co. in the trade names of HS-20, HS-30, HS-40 and by Towa Kasei Kogyo Co. in the trade names of PO-20, PO-30, PO-40, PO-60, PO-300, PO-500. These products placed in the market can be preferably used in the present invention.

The reduced startch saccharide is used in the starting composition in an amount of 5 to 30% by weight and, particularly, 10 to 25% by weight. The reduced starch saccharide that is used in an amount as described above makes it possible to obtain a solid drawing material having an increased resistance against being dried up, to form drawings on smooth surfaces such as glass surfaces and to maintain a bending strength necessary for a stick.

(4) Coloring Agents;

There is no particular limitation on the coloring agent used in the invention, and a known pigment or a dye can be used as required. For example, there can be used inorganic pigments such as iron black, iron yellow, red iron oxide, ultramarine, prussian blue, alumina white, carbon black, aluminum powder, bronze powder and mica; nitroso or nitro pigments such as Naphthol Green and Naphthol Yellow; azo lake pigments such as Lithol Red, Lake Red C, Brilliant Carmine 6B, Watchung Red, and Bordeaux 10B; insoluble azo pigments such as Fast Yellow, dis-azo yellow, Pyrazolone Orange, Para Red, Lake Red 4R, and Naphthol Red; condensed azo pigments such as Chromophthal Yellow and Chromophthal Red; dyeing Lake pigments such as Peacock Blue Lake, Alkali Blue Lake, Rhodamine Lake, Methyl Violet Lake, and Malachite Green Lake; phthalocyanine pigments such as Phthalocyanine Blue, Fast Sky Blue and Phthalocyanine Green; threne pigments such as anthrapyrimidine yellow, perynone orange, perine red, thioindigo red and indanthrone blue; quinacrydone pigments such as quinacrydone red and quinacrydone violet; dioxazine pigments such as dioxazine violet; isoindolenone pigments such as isoindolenone yellow; fluorescent pigments; and pearl pigments using mica as a base material.

As white pigments, further, there can be exemplified titanium oxide, zinc flower, lead white, zinc sulfide, antimony oxide, alumina white, satin white, and barium sulfate. Among these white pigments, titanium oxide is particularly desired.

When used as a coloring agent, the inorganic pigment is used in the starting composition in an amount of 1 to 40% by weight and, particularly, 10 to 35% by weight. When used as a coloring agent, further, the organic pigment is used in the starting composition in an amount of 1 to 15% by weight and, particularly, 2 to 10% by weight.

(5) Water Content;

Water is used in an amount with which the above-mentioned components are uniformly dispersed in a fine granular state. Concretely, water is used in the starting composition in an amount of 10 to 60% by weight and, particularly, 15 to 55% by weight. When the amount of water is smaller than the above range, the obtained solid drawing material tends to exhibit decreased applicability and draw feeling. When a drawing is formed, further, the surface that is drawn tends to become coarsened. When water is used in amounts larger than the above range, on the other hand, there arise such inconveniences that the drawing material exhibits a decreased strength, is broken or is collapsed.

(6) Other Components;

In order to adjust the fluidity of the solid drawing material of the present invention, there can be further used glycols such as ethylene glycol, propylene glycol and glycerin in addition to the above-mentioned components. Use of the glycols prevents the drawing material from becoming too soft and improves overlapping of application. Glycols are used usually in an amount of not larger than 20% by weight in the starting composition.

Production of the Solid Drawing Material;

The solid drawing material of the present invention is produced by adding the above-mentioned components, i.e., gel-forming substance, alkoxylated nitrogen-containing compound, reduced starch saccharide, coloring agent and water to a container equipped with, for example, a stirrer, refluxing device and a thermometer to prepare a starting composition thereof, and heating and molding the starting composition, followed by cooling.

There is no limitation on the order of adding the components. The starting composition can be further prepared by preparing a clear basic material of soap by using parts of the alkoxylated nitrogen-containing compound, gel-forming substance and water, and adding and mixing the clear basic material of soap to the remaining compounds.

The starting composition is heated usually at about 85 to 95° C. under a refluxing condition. The molding is executed by pouring the starting composition that is heated and melted into a mold such as a delivery-type holder or by extruding the starting composition that is heated and melted into a rod by using an extruder.

The solid drawing material of the present invention is thus produced by heating under a refluxing condition permitting water content to vaporize very little. Therefore, the contents of the components are substantially the same as those in the starting composition. In the solid drawing material, further, the components are at least partly present being dissociated or hydrolyzed, or in the form of reaction products upon reacting with each other. For example, the aliphatic alkali carboxylate metal salt which is the gel-forming substance partly reacts with the amino-alcohol to form an aliphatic alkanolamine carboxylate.

As compared to the conventional counterparts, the solid drawing material of the present invention features a large bending strength of stick, a small drawing resistance, is less subject to be collapsed or broken, produces little shavings while drawing, makes it possible to favorably draw even on smooth surfaces such as windowpanes, and of which the traces after drawn can be easily wiped out with a wet cloth. When a dye that dyes fibers little is used as a coloring agent, there can be obtained a solid drawing material of the washable type enabling hands and clothes tainted with the color to be easily washed away with water.

As shown in FIG. 1 of appearance, the solid drawing material of the present invention can be used being contained in a delivery-type holder. The holder comprises a cap 1, a barrel 3 and a rotary tail plug 4. The solid drawing material 2 is inserted and held in the barrel 3. The cap 1 is removed, the rotary tail plug 4 is turned, and the drawing material 2 is protruded beyond an end of the barrel 3 and is used.

EXAMPLES

The invention will now be concretely described by way of Examples and Comparative Examples to which only, however, the invention is in no way limited.

Described below are the starting materials and the evaluation methods used in Examples.

[Materials Used]

(1) Gel-forming substance;

Sodium stearate: trade name, SN-1, produced by Nihon Yushi Co.

(2) Alkoxylated nitrogen-containing compounds;

Triethanolamine: reagent available in the market

Isobutanolamine: reagent available in the market (3) Reduced starch saccharides;

Reduced starch saccharides available in the market (trade names, HS-20, HS-30, HS-40, sold by Hayashibara Shoji Co.)

The reduced starch saccharides are those obtained by hydrogenating (reducing) various starch syrups obtained by decomposing starches with an enzyme. The saccharide compositions and the solid components are shown in Table 1.

TABLE 1

| Trade name | HS-20 | HS-30 | HS-40 |
|---|---|---|---|
| (1) Saccharide composition (wt %) | | | |
| Monosaccharide | 2~4 | 4~6 | 1~5 |
| Disaccharide | 7~10 | 14~20 | 50~55 |
| Trisaccharide | 9~11 | 15~20 | 17~25 |
| Tetra- or higher saccharides | 75~80 | 60~65 | 23~30 |
| (2) Properties | colorless, clear and viscous liquid | colorless, clear and viscous liquid | colorless, clear and viscous liquid |
| (3) Solid component (wt %) | 69.0% or more | 68.0% or more | 69.0% or more |
| (4) pH | 4.0~6.5 | 4.0~6.5 | 4.0~6.5 |

(4) Coloring agents;

Yellow pigment: Pigment Yellow 12

White pigment: Pigment White 6

Red pigment: Pigment Red 48-3

Bronze pearl pigment: Iriodine 500, produced by Merc Japan Co.

Orange dye: Palmer Orange, produced by Milliken Chemical Co.

(5) Other materials;

Glycerin, ethylene glycol, propylene glycol: reagents placed in the market (6) Clear base material of soap;

Trade name, H-2, produced by Joongil Oil Chem. Co., Korea, containing the following components:

Sodium stearate, 30% by weight

Sodium laurate, 10% by weight

Sodium myristate, 21% by weight

Triethanolamine, 30% by weight

Water, 9% by weight

[Method of Evaluation]

The molded solid drawing materials (cylinders 50 mm in length and 11 mm in diameter) for evaluation were taken out from a 50° C constant-temperature chamber, left to stand at room temperature for 2 hours, and were evaluated as described below.

(a) Draw Shavings;

A high-quality paper was fixed onto a platform weighing machine, a line 10 cm long was drawn while adjusting the drawing pressure to be 3N (306 gf) to 4N (408 gf) as indicated by the platform weighing machine, and particles shaved due to the writing were observed by eyes. The basis of evaluation was as follows:

Little: Not more than one particle that could be confirmed by eyes.

Much: Numerous particles that could be observed by eyes.

(b) Drawing Resistance;

A paraffin paper measuring 90 mm long, 90 mm wide and 20 μm thick was fixed onto the platform weighing machine, a line was drawn one round right and left while adjusting the drawing pressure to be 3N (306 gf) to 4N (408 gf) as indicated by the platform weighing machine, and the state of the paraffin at that moment was observed. The basis of evaluation was as follows:

Small: The paraffin paper was not wrinkled at all.

Large: The paraffin paper was wrinkled.

(c) Drawing on the glass surface;

Applied onto the inside of the slide glass surface measuring 26 mm long and 76 mm wide except the peripheral portions of a width of 5 mm many times as thickly as possible. After dried, the weight that has increased was measured. The basis of evaluation was as follows:

Very Good: Amount applied was not less than 0.02 g.

Good: Amount applied was not less than 0.01 g but was less than 0.02 g.

Poor: Amount applied was less than 0.01 g.

(d) Fluidity of the Molten Material;

A cylinder having an inner diameter of 11 mm and a depth of 90 mm closed at one end thereof was erected upright in a manner that the opening was on the upper side, and the solid drawing material melted at 90° C. was poured therein at room temperature, and the filled state was observed. The basis of evaluation was as follows:

Good: The material was filled in the cylinder without forming gap.

Low: The material was partly poured into the cylinder but forming large gaps.

Very low: The material could not be almost poured into the cylinder.

(e) Bending Strength (N);

Measured in compliance with the JIS S 6026-5.6. Measurement was taken at room temperature (about 25° C.). The load was exerted and was measured when a test piece was broken.

Example 1

Into a container equipped with a stirrer, a refluxing device and a thermometer, were added sodium stearate as a gel-forming substance, HS-20 as a reduced starch saccharide, a yellow pigment (Pigment Yellow 12) as a coloring agent, a clear base material of soap, water and glycerin at a blending ratio shown in Table 2, which were, then, heated at 90° C. with stirring under a refluxing condition. The molten material was poured into a delivery-type holder of an inner diameter of 11 mm, and was cooled and solidified to obtain a yellow solid (stick-like) drawing material.

The bending strength was 28.4 N. A drawing was formed on a drawing paper by using the stick. The stick did not collapse even when it was strongly pushed, and lines could be drawn in a very smooth and vivid yellow color. The lines could be splendidly blurred upon being rubbed with a brush impregnated with water. Drawings could be formed even on smooth surfaces such as of glasses, and could be easily wiped out with a wet cloth. The results of evaluation were as shown in Table 2.

Example 2

By using the components shown in Table 2, a solid drawing material of a pink color was obtained by the same method as the one described in Example 1.

When the reduced starch saccharide was contained much like the solid drawing material of Example 2, a drawing could be formed very favorably on smooth surfaces like those of glasses, lending the solid drawing material particularly well for describing a drawing such as window decoration. The bending strength was 10.8 N. The results of evaluation were as shown in Table 2.

Example 3

By using the components shown in Table 2, a solid drawing material of a bronze color was obtained by the same method as the one described in Example 1. In Example 3, the clear base material of soap was not used but, instead, a triethanolamine was added as the alkoxylated nitrogen-containing compound. The results of evaluation were as shown in Table 2.

Example 4

By using the components shown in Table 2, a solid drawing material of an orange color was obtained by the same method as the one described in Example 3.

A drawing was formed on a drawing paper by using the thus obtained solid drawing material of orange color. The stick did not collapse even when it was strongly pushed, and lines could be drawn in a very smooth and vivid orange color. The lines could be splendidly blurred upon being rubbed with a brush impregnated with water. Drawings could be formed even on smooth surfaces such as of glasses, and could be easily wiped out with a wet cloth. The results of evaluation were as shown in Table 2. To examine the washability, the solid drawing material was applied onto a multi-filament woven fabric for testing JIS dye color fastness, completely dried, and was washed. No trace of color remained at all. The bending strength was 28.9 N.

The solid drawing material of Example 4 with which the hands and clothes are tainted can be easily washed away, and is suited for use as a crayon for children. The results of evaluation were as shown in Table 2.

Comparative Example 1

A solid drawing material of an orange color was obtained by the same method as the one in Example 3 but replacing the whole amounts of triethanolamine and the reduced starch saccharide in Example 4 by water.

In this Example, the material that was heated and mixed possessed a poor fluidity and could not be poured into the holder. When solidified in its form, the solid drawing material produced a large drawing resistance and much draw shavings when forming a drawing on the surface of the paper. No drawing could be formed on the glass surface. The blended components and the evaluated results were as shown in Table 3.

TABLE 2

| | Example No. | | | | | | | |
|---|---|---|---|---|---|---|---|---|
| | Example 1 | | Example 2 | | Example 3 | | Example 4 | |
| Blended components | wt. parts | wt % | wt. parts | wt % | wt. parts | wt % | wt. parts | wt % |
| Gel-forming substances | | | | | | | | |
| Sodium stearate | 144 | 32.8 | 181.5 | 24.7 | 176 | 35.9 | 170 | 39.1 |
| Sodium laurate | 8 | 1.8 | 10.5 | 2.3 | — | — | — | — |
| Sodium myristate | 16.8 | 3.8 | 22.1 | 4.9 | — | — | — | — |
| Subtotal | (168.8) | (38.3) | (214.1) | (31.9) | | | | |
| Alkoxylated nitrogen Compound | | | | | | | | |
| Triethanolamine | 24 | 5.5 | 32 | 4.3 | — | — | 25 | 5.7 |
| Isobutanolamine | — | — | — | — | 24 | 4.9 | — | — |
| Reduced starch Saccharides | | | | | | | | |
| HS-40 | 50 | 11.4 | — | — | — | — | — | — |
| HS-30 | — | — | — | — | 50 | 10.2 | — | — |
| HS-20 | — | — | 165 | 22.4 | — | — | 50 | 11.5 |
| Pigments | | | | | | | | |
| Pigment Yellow 12 | 10 | 2.3 | — | — | — | — | — | — |
| Pigment Red 48-3 | — | — | 15 | 2.0 | — | — | — | — |
| Palmer Orange | — | — | — | — | — | — | 25 | 5.7 |
| Pigment White 6 | — | — | 120 | 16.3 | — | — | 5 | 1.1 |
| Iriodine 500 | — | — | — | — | 60 | 12.2 | — | — |
| Others | | | | | | | | |
| Water | 137.2 | 31.1 | 129.5 | 17.6 | 130 | 26.5 | 110 | 25.3 |
| Glycerin | 50 | 11.4 | — | — | — | — | — | — |
| Ethylene glycol | — | — | 60 | 8.2 | — | — | — | — |
| Propylene glycol | — | — | — | — | 50 | 10.2 | 50 | 11.5 |
| Total | (440) | | (735) | | (490) | | (435) | |
| Blended amount as clear | | | | | | | | |
| base material of soap | 80.0 | 18.2 | 105.0 | 14.3 | | | | |
| Sodium stearate | 24.0 | 5.5 | 31.5 | 4.3 | | | | |
| Sodium laurate | 8.0 | 1.8 | 10.5 | 1.4 | | | | |
| Sodium myristate | 16.8 | 3.8 | 22.1 | 3.0 | | | | |
| Triethanolamine | 24.0 | 5.5 | 31.5 | 4.3 | | | | |
| Water | 7.2 | 1.6 | 9.5 | 1.3 | | | | |
| Evaluated results | | | | | | | | |
| (a) Draw shavings | little | | little | | little | | little | |
| (b) Drawing resistance | small | | small | | small | | small | |
| (c) Drawing on a glass surface | good | | very good | | good | | good | |
| (d) Fluidity of the molten material | good | | good | | good | | good | |
| (e) Bending strength (N) | 28.4 | | 10.8 | | 26.5 | | 28.9 | |

Comparative Example 2

A solid drawing material was obtained by the same method as the one in Example 3 but replacing the whole amount of the reduced starch saccharide in Example 4by water.

In this Example, the material that was heated and mixed could be poured into the holder. The drawing could be formed on the paper with small drawing resistance and smoothly producing, however, draw shavings. No drawing could be formed on the glass surface. The bending strength was 26.5 N. The blended components and the evaluated results were as shown in Table 3.

Comparative Example 3

A solid drawing material was obtained by the same method as the one in Example 3 but replacing the whole amount of triethanolamine in Example 4 by the reduced starch saccharide. In this Example, the material that was heated and mixed possessed a low fluidity and could not be poured into the holder. When solidified in its form, draw shavings were produced little, and a drawing could be formed on the glass surfaces. The blended components and the evaluated results were as shown in Table 3.

Comparative Example 4

A solid drawing material was obtained by the same method as the one in Example 3 but replacing the whole amount of water in Example 4 by the reduced starch saccharide.

In this Example, the material that was heated and mixed possessed a low fluidity, could be gelled at a high temperature, tended to be easily solidified and could not be poured into the holder. When solidified in its form, draw shavings were produced little, and a drawing could be favorably formed even on the glass surfaces accompanied, however, by a large drawing resistance. The blended components and the evaluated results were as shown in Table 3.

TABLE 3

| | Comparative Example No | | | | | | | |
|---|---|---|---|---|---|---|---|---|
| | Comp. Example 1 | | Comp. Example 2 | | Comp. Example 3 | | Comp. Example 4 | |
| Blended components | wt. parts | wt % | wt. parts | wt % | wt. parts | wt % | wt. parts | wt % |
| Gel-forming substances | | | | | | | | |
| Sodium stearate | 170 | 39.1 | 170 | 39.1 | 170 | 39.1 | 170 | 39.1 |
| Alkoxylate nitrogen-containing compound | | | | | | | | |
| Triethanolamine | — | — | 25 | 5.7 | — | — | 25 | 5.7 |
| Reduced starch Saccharide | | | | | | | | |
| HS-30 | — | — | — | — | 75 | 17.2 | — | — |
| HS-20 | — | — | — | — | — | — | 160 | 36.8 |
| Pigments | | | | | | | | |
| Palmer Orange | 25 | 5.7 | 25 | 5.7 | 25 | 5.7 | 25 | 5.7 |
| Pigment White 6 | 5 | 1.1 | 5 | 1.1 | 5 | 1.1 | 5 | 1.1 |
| Others | | | | | | | | |
| Water | 185 | 42.5 | 160 | 36.8 | 110 | 25.3 | — | — |
| Propylene glycol | 50 | 11.5 | 50 | 11.5 | 50 | 11.5 | 50 | 11.5 |
| Total | (435) | | (435) | | (435) | | (435) | |
| Evaluated results | | | | | | | | |
| (a) Draw shavings | much | | much | | less | | less | |
| (b) Drawing resistance | large | | small | | large | | large | |
| (c) Drawing on a glass surface | impossible | | impossible | | good | | good | |
| (d) Fluidity of the molten material | low | | good | | low | | very low | |
| (e) Bending strength (N) | *could not be measured | | 26.5 | | *could not be measured | | *could not be measured | |

*The material could not be poured into the holder, and the bending strength could no be measured.

What we claim is:

1. A solid drawing material containing a gel-forming substance of an alkali metal salt or an ammonium salt of an aliphatic carboxylic acid having 8 to 36 carbon atoms, an alkoxylated nitrogen-containing compound, a reduced starch saccharide, and a coloring agent.

2. A solid drawing material according to claim 1, wherein said reduced starch saccharide is obtained by decomposing a starch with an enzyme followed by reduction by hydrogenation.

3. A solid drawing material according to claim 1, wherein said alkoxylated nitrogen-containing compound is an aliphatic amino-alcohol.

4. A solid drawing material according to claim 3, wherein said aliphatic amino-alcohol is at least one selected from the group consisting of ethanolamine, diethanolamine, triethanolamine, dimethylethanolamine, isopropanolamine, triisopropanolamine and isobutanolamine.

5. A method of producing a solid drawing material comprising steps of:

preparing a starting composition which contains a gel-forming substance of an alkali metal salt or an ammonium salt of an aliphatic carboxylic acid having 8 to 36 carbon atoms, an alkoxylated nitrogen-containing compound, a reduced starch saccharide, a coloring agent and water; and molding said starting composition by heating followed by cooling.

6. A method of producing a solid drawing material according to claim 5, wherein said starting composition contains said gel-forming substance in an amount of 5 to 50% by weight, the alkoxylated nitrogen-containing compound in an amount of 2 to 20% by weight and the reduced starch saccharide in an amount of 5 to 30% by weight.

* * * * *